(12) United States Patent
Bosan et al.

(10) Patent No.: US 8,194,849 B2
(45) Date of Patent: Jun. 5, 2012

(54) SYSTEM AND METHOD FOR PROVIDING AUDIBLE MESSAGES IN REPLACEMENT OF TELEPHONE TONES

(75) Inventors: Sorel Bosan, Waterloo (CA); Janice Zima, Waterloo (CA)

(73) Assignee: Research In Motion Limited, Waterloo (CA)

( * ) Notice: Subject to any disclaimer, the term of this patent is extended or adjusted under 35 U.S.C. 154(b) by 387 days.

(21) Appl. No.: 12/394,474

(22) Filed: Feb. 27, 2009

(65) Prior Publication Data

US 2010/0220843 A1 Sep. 2, 2010

(51) Int. Cl.
H04M 1/00 (2006.01)
(52) U.S. Cl. .............................. 379/373.02; 379/374.02
(58) Field of Classification Search .............. 379/67.1, 379/68, 76, 373.02, 374.02, 374.01, 31, 283
See application file for complete search history.

(56) References Cited

U.S. PATENT DOCUMENTS

| | | | | |
|---|---|---|---|---|
| 5,083,312 A * | 1/1992 | Newton et al. | ................ | 381/320 |
| 5,854,826 A * | 12/1998 | Kim | ................................. | 379/68 |
| 5,960,363 A * | 9/1999 | Mizikovsky et al. | ....... | 455/550.1 |
| 6,044,149 A * | 3/2000 | Shaham et al. | ............... | 379/377 |
| 6,233,323 B1 * | 5/2001 | Ali et al. | ..................... | 379/93.27 |
| 6,477,390 B1 * | 11/2002 | Gum et al. | ................. | 455/550.1 |
| 6,490,343 B2 * | 12/2002 | Smith et al. | ...................... | 379/52 |
| 6,757,276 B1 * | 6/2004 | Harper et al. | ................. | 370/356 |
| 7,139,376 B2 * | 11/2006 | Nabkel et al. | ............ | 379/201.01 |
| 7,187,761 B2 * | 3/2007 | Bookstaff | ................ | 379/201.01 |
| 7,844,262 B2 * | 11/2010 | Diroo et al. | .................... | 455/418 |
| 2004/0091093 A1 | 5/2004 | Bookstaf | | |
| 2005/0243872 A1 * | 11/2005 | Monai | ............................ | 370/525 |
| 2007/0064921 A1 * | 3/2007 | Albukerk et al. | ......... | 379/373.02 |
| 2007/0116227 A1 * | 5/2007 | Vitenson et al. | .......... | 379/207.02 |
| 2009/0060159 A1 * | 3/2009 | Chatterjee | ................ | 379/207.02 |
| 2009/0185668 A1 * | 7/2009 | Daloz et al. | ................ | 379/88.12 |

FOREIGN PATENT DOCUMENTS

GB 2405551 3/2005
WO 01/37527 A2 5/2001

OTHER PUBLICATIONS

Examination Report issued by the European Patent Office dated Feb. 16, 2010 for corresponding European Patent Application No. 09153978.3.
Extended European Search Report issued by the European Patent Office dated Jul. 20, 2009 for corresponding European Patent Application No. 09153978.3.

* cited by examiner

Primary Examiner — Olisa Anwah
(74) Attorney, Agent, or Firm — Gowling Lafleur Henderson LLP (57) ABSTRACT

A computer implemented system and method for providing at least one audible message at a communication device in replacement of a pre-determined telephone tone. There is provided a tone detector interface for detecting the pre-determined telephone tone provided at the communication device; an audible messages database accessible to the tone detector interface and the communication device, the audible messages database storing the audible messages; and a tone replacement module in communication with the tone detector interface. The tone replacement module, in response to detecting the pre-determined telephone tone, may provide the audible message in replacement of the pre-determined telephone tone.

4 Claims, 5 Drawing Sheets

SYSTEM AND METHOD FOR PROVIDING AUDIBLE MESSAGES IN REPLACEMENT OF TELEPHONE TONES

CROSS-REFERENCE TO RELATED APPLICATIONS

This application is related to the commonly-assigned applications U.S. Ser. No. 12/394,481 for "System and Method for Monitoring Message Usage" naming Sorel Bosan, Janice Zima, and Sheryl Lee Lorraine Scott as inventors, and U.S. Ser. No. 12/394,495 for "System and Method for Delivery and Display of Messages" naming Sorel Bosan and Janice Zima as inventors, and furthermore the contents of all of the aforementioned applications are hereby incorporated by reference herein.

FIELD

The present matter relates generally to generating audible messages on a communication device and specifically to a method and system for providing audible messages, including advertisements, in replacement of standard telephone tones.

BACKGROUND

With the proliferation of telecommunication devices, communication providers are constantly looking for new techniques and new avenues to communicate their messages to a large number of users. Typically, when a phone call is initiated and placed between telecommunication devices, various standard telephone tones may be generated during different stages of the call, at each of the caller communication device and recipient communication device involved in the call.

BRIEF DESCRIPTION OF THE DRAWINGS

One or more embodiments will now be described by way of example only with reference to the following drawings in which.

DETAILED DESCRIPTION

Communication providers are finding it increasingly challenging to communicate messages to their communication device users, because once users become accustomed to a communication venue (for example, commercials and billboards), they may start to ignore or avoid such messages. A related concern is that for mobile or handheld communication devices may be sensitive to battery power depletion and thus may need to minimize the duration of any message presented.

Accordingly, there is a need for allowing broadcast audio messages to be played on telecommunication devices. The audio messages may include commercial advertisements as well as other announcements or messages of a non-commercial nature.

In accordance with one aspect there is provided a computer implemented system for providing at least one audible message at a communication device in replacement of a pre-determined telephone tone, comprising a tone detector interface for detecting the pre-determined telephone tone provided at the communication device; an audible messages database accessible to the tone detector interface and the communication device, the audible messages database storing the at least one audible message; and a tone replacement module in communication with the tone detector interface, the tone replacement module, in response to detecting the pre-determined telephone tone, providing the audible message in replacement of the pre-determined telephone tone.

In one embodiment, the pre-determined telephone tone is selected from the group consisting of: an off-hook tone, a dual tone multiple frequencies (DTMF) tone, a number busy tone, a network busy tone, a ring-back tone, and a ring tone.

In another embodiment, the pre-determined telephone tone comprises a dual tone multiple frequencies (DTMF) tone, and the at least one audible message is associated with the DTMF tone; whereby the at least one audible message provided in replacement of the DTMF tone is generated by dialing a respective digit of a recipient phone number.

The at least one audible message may be selected from the group of audible messages consisting of: advertisements, announcements, and messages associated with information on the communication device.

In an embodiment, at least one of the tone detector interface or the tone detector module is located on the communication device.

In an alternate embodiment, at least one of the tone detector interface or the tone detector module is located remotely on a server accessible to the communication device.

Yet another embodiment comprises a voice detector for detecting a voice generated at a called recipient phone number, wherein, in response to detecting the voice generated, the tone replacement module is configured to terminate providing the at least one audible message in replacement of the pre-determined telephone tone.

There is further provided a communication device comprising: a tone detector interface for detecting a pre-determined telephone tone provided at the communication device; and a tone replacement module in communication with the tone detector interface, the tone replacement module providing the at least one audible message in replacement of the pre-determined telephone tone, in response to detecting the pre-determined telephone tone, wherein the at least one audible message is stored within an audible messages database accessible to the communication device.

The communication device, in one embodiment, comprises a voice detector for detecting a voice generated at a called recipient number, wherein, in response to detecting the voice generated, the tone replacement module is configured to terminate providing the at least one audible message in replacement of the pre-determined telephone tone.

There is further provided a computer implemented method for providing at least one audible message at a communication device in replacement of a pre-determined telephone tone, the method comprising: detecting, at a tone detector interface, a pre-determined telephone tone provided at the communication device; replacing, at a tone replacement module, the pre-determined telephone tone provided at the communication device with the at least one audible message in response to detecting the pre-determined telephone tone, the at least one audible message being stored on an audible messages database accessible to the communication device.

In one embodiment, the pre-determined telephone tone is selected from the group consisting of: an off-hook tone, a dual tone multiple frequencies (DTMF) tone, a number busy tone, a network busy tone, a ring-back tone and a ring tone.

In another embodiment, the at least one audible message is associated with the dual tone multiple frequencies (DTMF) tone, wherein the at least one audible message provided in replacement of the DTMF tone is generated by dialing a respective digit of a recipient phone number.

The at least one audible message may be selected from the group of audible messages consisting of: advertisements, announcements, and messages associated with information on the communication device.

The at least one of the tone detector interface and the tone detector module are located on the communication device, in one embodiment.

In an alternate embodiment, at least one of the tone detector interface and the tone detector module are located remotely on a server accessible to the communication device.

The method may further comprise detecting a voice generated at a called recipient phone number; and terminating, in response to detecting the voice generated at the called recipient number, the providing of the at least one audible message in replacement of the pre-determined telephone tone.

In another embodiment, there is provided a computer readable medium comprising instructions, which, when executed on a computer, cause the computer to implement the method for providing at least one audible message at a communication device in replacement of a pre-determined telephone tone.

In yet another embodiment, there is provided a communication device comprising: a processor and a memory coupled thereto, the memory storing instructions and data configuring the processor to perform the method for providing at least one audible message at a communication device in replacement of a pre-determined telephone tone.

The method, in yet another embodiment, may further comprise generating and playing the at least one audible message until the tone detector interface no longer detects an off-hook tone.

The method, in another alternate embodiment, may comprise generating and playing the at least one audible message until the tone detector interface detects a call recipient voice.

Figure 1:
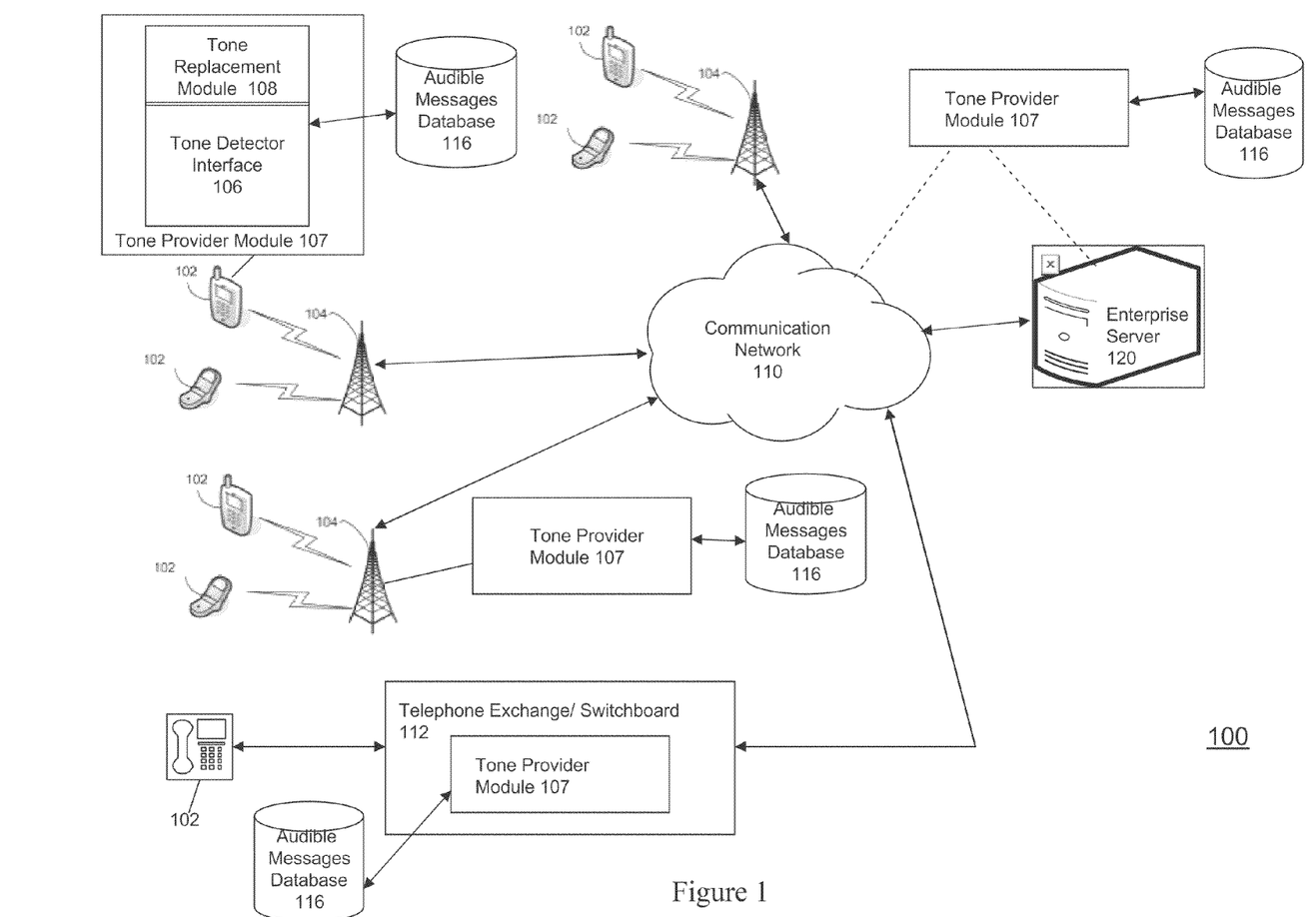
FIG. 1 is a block diagram illustrating a communication system according to one embodiment.

Referring to FIG. 1, a communication system is illustrated generally by numeral 100. The communication system 100 comprises a plurality of caller communication devices 102, and a communication network 110. The caller communication devices 102 are referred to generally as communication devices herein. The communication devices 102 may include any wired or wireless telephony device such as a smart phone, a BLACKBERRY (BlackBerry™) communication device by Research In Motion Ltd. for example, a wired telephone and the like. The caller communication devices 102, which may be wireless or mobile devices, are in communication with one of the base stations 104. The base stations 104 relay data between the mobile devices and other communication devices 102 via the communication network 110.

Accordingly, the communication network 110 facilitates communication between the communication devices 102. Further, the communication network 110 may include one or more of components including a wireless network, a relay, a Public Switched Telephone Network (PSTN), a Voice over Internet Protocol (VoIP) network, a corporate server and the like. An example of a corporate server is the BlackBerry Enterprise Server provided by Research In Motion Ltd. The corporate server may provide functions for enabling wireless applications, including network connectivity, encryption, data transcoding, and ensuring connectivity between communication devices.

Referring again to FIG. 1, the communication system 100 provides audible messages on the communication device 102 in response to detecting pre-determined telephone tones and in replacement of standard telephony tones. The standard telephony tones may include call initiation tones such as dial-tones, dialing tones such as DTMF tones, and connection tones such as the network busy tone, ring-back tone, and busy tone, as well as a ring tone generated at a recipient communication device 102. Other standard telephony tones as known to a person skilled in the art may be replaced according to the system 100. As illustrated in FIG. 1, a call is placed between communication device 102 and another recipient communication device.

Figure 2:
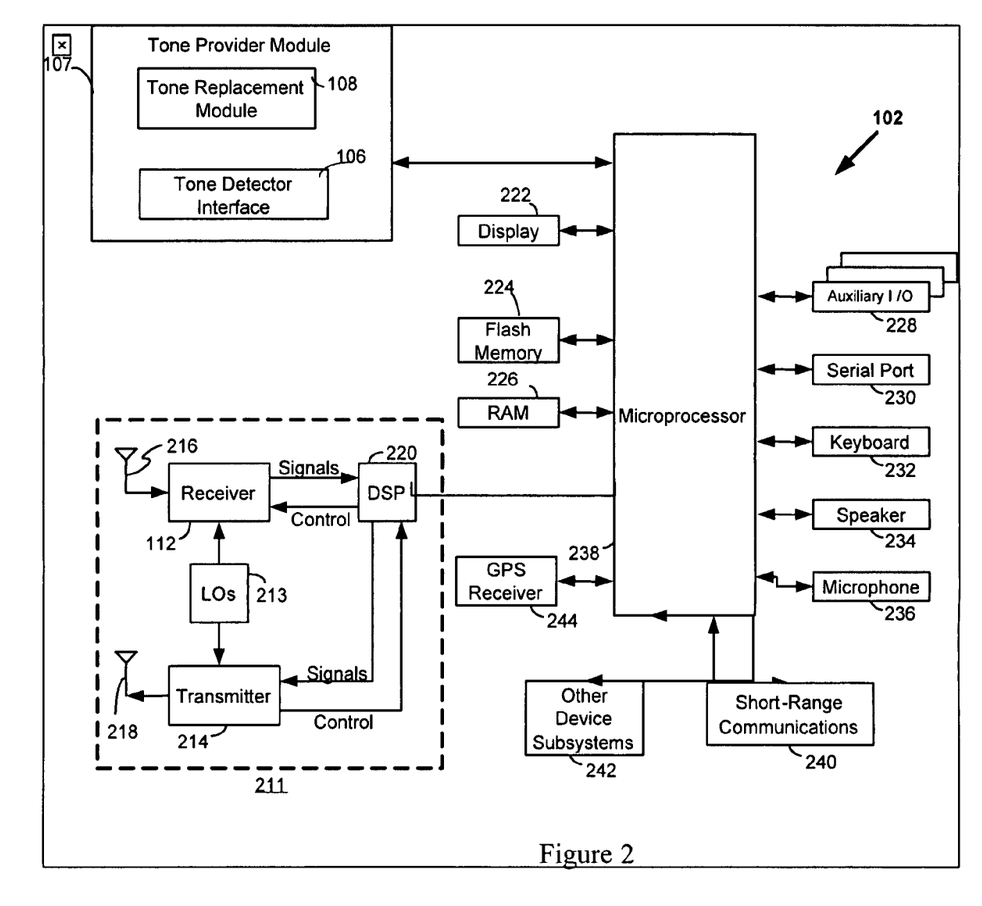
FIG. 2 is an exemplary block diagram of the communication device of FIG. 1.

Referring to FIG. 2, components of the mobile device 102 are illustrated in greater detail. The mobile device 102 is often a two-way communication device having both voice and data communication capabilities, including the capability to communicate with other computer systems. Depending on the functionality provided by the mobile device 102, it may be referred to as a data messaging device, a two-way pager, a cellular telephone with data messaging capabilities, a wireless Internet appliance, or a data communication device.

The mobile device 102 includes a communication subsystem 211, which includes a receiver 212, a transmitter 214, and associated components, such as one or more embedded or internal antenna elements 216 and 218, local oscillators (LOs) 213, and a processing module such as a digital signal processor (DSP) 220. As will be apparent to those skilled in field of communications, the particular design of the communication subsystem 211 depends on the communication network in which mobile device 102 is intended to operate.

The mobile device 102 includes a microprocessor 238 which controls general operation of the mobile device 102. The microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240 such as Bluetooth™ for example, and any other device subsystems or peripheral devices generally designated at 242. The mobile device 102 may also include a positioning device 244, such as a GPS receiver for example, for receiving positioning information. As will be described, the GPS receiver may be configured to detect and provide location information in order to determine if the location of the mobile device 102 meets pre-determined location criteria (i.e. criteria set by the billing system 114). For example, based on whether the pre-determined location information is met, the billing system 114 may then determine whether to provide financial compensation for an audible advertisement outputted on the mobile device 102.

Operating system software used by the microprocessor 238 may be stored in a persistent store such as the flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

The microprocessor 238, in addition to its operating system functions, enables execution of software applications on the mobile device 102. A predetermined set of applications, which control basic device operations, is installed on the mobile device 102 during its manufacture. These basic operations typically include data and voice communication applications, for example. Additionally, applications may also be loaded onto the mobile device 102 through the network 106, an auxiliary I/O subsystem 228, serial port 230, short-range communications subsystem 240, or any other suitable subsystem 242, and installed by a user in RAM 226, or the persistent store 224, for execution by the microprocessor 238. Such flexibility in application installation increases the functionality of the mobile device 102 and may provide enhanced on-device features, communication-related features, or both.

The display 222 is used to visually present an application's graphical user interface (GUI) to the user. The user can manipulate application data by modifying information on the GUI using an input device such as the keyboard 232 for example. Depending on the type of mobile device 102, the user may have access to other types of input devices, such as, for example, a scroll wheel, trackball, light pen or touch sensitive screen.

Typically, when a phone call is initiated and placed between telecommunication devices, including personal digital assistants, cellular telephones, two-way pagers, wired/fixed telephones (i.e. PSTN telephones), a number of standard or pre-determined telephone tones may be generated at each of the caller communication device and recipient communication device involved in the call. Various tones may be generated when a call is initiated, such as when the caller picks up the phone or the phone goes "off-hook", when the caller is dialing the recipient communication device, and yet after dialing the number of the recipient communication device when an attempted call connection is made.

In a wired telephone, an "off-hook" dial-tone may typically be generated by the telephone exchange system/switchboard and heard at the caller's telephone to indicate that the exchange is properly functioning and that it is available to accept calls from the wired telephone. Typically, when the user begins to press the digits on a keypad of the telephone, the dial-tone is stopped, and during dialing, for each number or symbol of a telephone keypad that is pressed, dual tone multiple frequencies (DTMF) tones are generated and heard at the caller's end. These tones generally consist of two pure frequencies and are used for telephone signaling between the switchboard and the caller device. For example, the DTMF tones are used for instructing a telephone switching system of the telephone number to be dialed, whereby depressing a single key on a telephone keypad produces two pure sinusoidal tones.

Other tones may be generated once the caller has dialed the desired telephone number and attempted a call connection to the recipient telephone device being called. Such connection tones indicating the status of the attempted connection between two communication devices/telephones may include, but are not limited to, ring-back tones, line busy tone, the network busy tone and "invalid number dialed" tone.

A telephone ring tone may generated at the recipient device once the caller has dialed the desired telephone number at the caller communication device 102 and successfully attempted a call connection with the recipient device.

In the case of wireless communication devices, such as digital communication-based mobile phones, no dial-tone may be generated when dialing. Rather, the user dials the recipient phone number and activates a "SEND" or "CALL" function, or other similar button or switch, to go off-hook and attempts a call connection with the recipient device. The user may however, hear a DTMF tone, or dialing tone, as each key representing a digit of the recipient telephone number is depressed. Once the attempted call connection is successfully made, the user may also hear a connection tone as discussed above.

In one embodiment illustrated in FIG. 2, the user's device (i.e. the communication device 102) comprises a tone provider module 107. The tone provider module 107 is an adapter or interface which receives telephone signals and requests for communication between the caller communication device 102 and a recipient communication device. Accordingly, upon receiving an indication of the status and progress of the call via one or more telephone tones, the tone provider module 107 provides pre-defined audible messages for replacing the standard telephony tones.

Accordingly, the tone provider module 107 may comprise a tone detector interface 106 and a tone replacement module 108. The tone detector interface 106 is configured for communicating with the communication device 102. The tone detector interface 106 detects when a telephone has gone "off-hook" to start dialing and/or when a user has started dialing a telephone number of a recipient communication device. Further, the tone detector interface 106 also communicates with a recipient communication device, via the communication network 110 to detect status of the call connection attempted between the communication devices. For example, the tone detector interface 106 may detect call completion or determine that the recipient communication device is otherwise unreachable, such as via the respective connection tone.

The tone replacement module 108 may be adapted for converting standard telephone tones communicated between the caller and recipient communication devices to pre-determined audible messages via an audible messages database 116.

The audible messages database 116 of FIG. 1 stores a plurality of audible messages associated with each telephone tone. The messages may comprise advertisements, including advertisement "jingles" commercially associated with a certain company or other provider of a product or service. The messages may comprise announcements or may be more generally related to information contained in memory of the applications on communication device 102. For example, one or more audible messages may be associated with a respective dialing tone that is the DTMF tone generated from dialing a given digit of the recipient phone number. The dialing tone described herein may refer more generally to a telephone tone indicating that the device has started dialing one or more digits of a recipient telephone number. Each digit, as it is being dialed, generates an audible dialing tone capable of being detected at communication device 102. In response to the detected telephone tone, the tone provider module 107 provides the associated audible message to the communication device 102 in replacement of the pre-determined telephone tones that are typically heard at caller communication device 102.

The audible messages stored for audible output on a caller or a recipient communication device 102 may include advertisements, announcements such as company announcements or broadcast messages directed to groups of individuals, and messages associated with information received from the communication devices 102. Such information may include calendar event information received from the communication device 102.

Accordingly, in one embodiment, the tone detector interface 106 is configured to receive calendar event information stored on the memory of the communication device 102. Accordingly, the tone provider module 107 or the communication device 102 may comprise an audio synthesizer (not shown) for converting said received calendar event information into audible messages. The tone replacement module 108 may be further adapted to provide or to trigger the retrieval of the audible calendar event information in response to detecting one or more pre-determined telephone tones (i.e. initiation or off-hook signal, dialing signal, and connection signal) as described herein.

In one embodiment, the audible messages database 116 may be stored directly on tone provider module 107, and for accessibility thereto. For example, in the present embodiment, the communication device 102 may include memory for storing the audible messages database 116.

Accordingly, the tone replacement module 108 is in communication with said database 116 and the tone detector interface 106 and provides at least one of said plurality of audible messages retrieved from said database 116 to the communication device. As will be described in reference to FIGS. 2 and 3, the audible messages are provided in response to receiving for example, a dialing tone comprising a DTMF tone that is detected when the user of the caller communication device starts to dial a digit of the number of the recipient communication device. In this case, one or more audible messages replace each of the DTMF tones that are typically played when the user dials the phone number of the recipient communication device. Alternately, the audible messages are provided in response to an initiation telephone signal (i.e. a signal indicating that the phone has gone off-hook and the user is ready to start dialing). In this case, one or more audible messages replace the standard dial-tone that is typically associated with the off-hook signal.

Further alternately, the audible messages are provided by the tone replacement module 108 in response to an attempted call connection telephone tone, such as a tone indicating the status of connection between the caller and recipient communication devices. Such tones may include call completed tone, network busy tone, line or number busy tone, invalid number dialed tone, or ring-back tones, or a ring tone at the recipient phone. However, it is contemplated that other telephone tones may be applied or incorporated. In this case, one or more audible messages replace such tones typically associated with a telephone call connection attempt.

In the present embodiment, the tone provider module 107 is provided by a software application on the communication device 102. In another embodiment illustrated with dashed lines in FIG. 1, the tone provider module 107 comprising tone detector interface 106 and tone replacement module 108 are provided by the communication network 110. In this case, the tone provider module 107 may reside on for example any one of the corporate server (for example, the BlackBerry Enterprise Server) or servers associated with the Public Switched Telephone Network (PSTN), a Voice over Internet Protocol (VoIP) network and the like. Similar to the functionality described above, the tone provider module 107 (now resident on one or more computing devices and/or servers on the communication network 110) is adapted to detect the telephone tones from the communication device 102. As described earlier, detecting the telephone request tones may include either one or both of receiving an indication that the communication device 102 is off-hook and receiving an indication for each digit/key pressed by the communication device 102. The tone replacement module 108 then provides the associated audible messages to the communication device 102 in response to receiving an indication of dialing. The tone provider module 107 also detects the status or progress of calls from the recipient communication device and provides audible messages in replacement of standard call completion tones to the communication device 102.

As described earlier, typically, when a user starts dialing a telephone number, each digit generates a DTMF tone that is heard at the communication device 102. Accordingly, in the present embodiment where the tone provider module 107 is located within one or more servers of the communication network 110, the processor of the communication device 102 may be programmed to silence the DTMF tones such that the audible messages provided by the tone provider module 107 are played instead.

In the present embodiment, the audible messages database 116 may either be stored locally on the communication device 102 (i.e. downloaded from a remote server prior to call placement).

In alternate embodiments, the audible messages database 116 may be stored remotely on the communication network 110, or on enterprise server 120, while being accessible by tone provider module 107 as needed. In such embodiments, tone provider module 107 may be located at the enterprise server 120, or on communication network 110, as depicted in FIG. 1, and accessible to communication device 102 via base stations 104. The functionality of such a tone provider module 107 is similar to that described herein.

Accordingly, the communication device 102 may comprise a user interface for requesting and downloading desired audible messages thereon. For example, a user may download one or more audible messages and, for customization, associate each with a different action/event (i.e. an audible message to be played once the phone is off-hook). Accordingly, once the tone provider module 107 detects that the pre-determined event has occurred, it may instruct the processor of the communication device 102 to retrieve the relevant audible message and audibly output the message on the communication device 102.

Alternately, depending on user preferences, audible messages may be pushed from the enterprise server 120 or communication network 110 to the user's communication device 102, for local storage in memory thereon. Yet further, the user may customize by only authorizing those audible messages having desired or relevant content.

In the case of wireless communication devices 102, in contrast to wired (or "landline") communication devices, dial-tones are not typically generated once the phone is picked up or off-hook. Accordingly, the tone provider module 107 may provide a "spoofed" dial-tone in the form of pre-determined audible messages to be played at caller communication device 102 once it is detected that the caller is preparing to make a call. The preparation to make a call may be determined by requiring the user to depress one or more predetermined keys of the phone keypad prior to dialing or when a user scrolls through a menu screen to indicate a desire to place a call. Alternatively the preparation to make a call may be detected when the mobile communication device 102 is characterized by a clamshell or slider form factor, and the device 102 is flipped open or slid open, respectively. Accordingly, the tone detector interface 106 may be adapted to interpret a sequence of one or more user events, such as requiring entry of one or more predetermined keys of the phone keypad prior to dialing, scrolling through the address book menu screen, or selecting and clicking a phone number entry of a web page presented at user interface display screen 222 to indicate a desire to place a call as an "off-hook" telephone signal and thus proceed accordingly. Other examples of indicating and determining a desire to make a call may include initiating direct dialing of a sequence of digits of a recipient phone number via the keypad or keyboard 232, voice dialing, or selecting and activating a speed dial entry.

In yet another embodiment, the communication device 102 may comprise a wired or fixed "landline" telephone coupled to a telephone exchange or switchboard 112. Typically, the telephone switchboard 112 is detects when the phone is off-hook and provides an off-hook tone. The telephone switchboard 112 also provides the DTMF dial-tone as each digit of a recipient number id dialed, as well as for forwarding the connection tone (i.e. busy tone, or ring-back tone) from the recipient communication device to the caller communication device 102. In the present embodiment, the telephone switchboard 112 comprises the tone provider module 107 for providing one or more audible messages in response to the telephone tone detected (i.e. off-hook signal, dialing tones, attempted connection tones, ring tone) as described herein, and in replacement of those telephone tones.

Figure 3A:
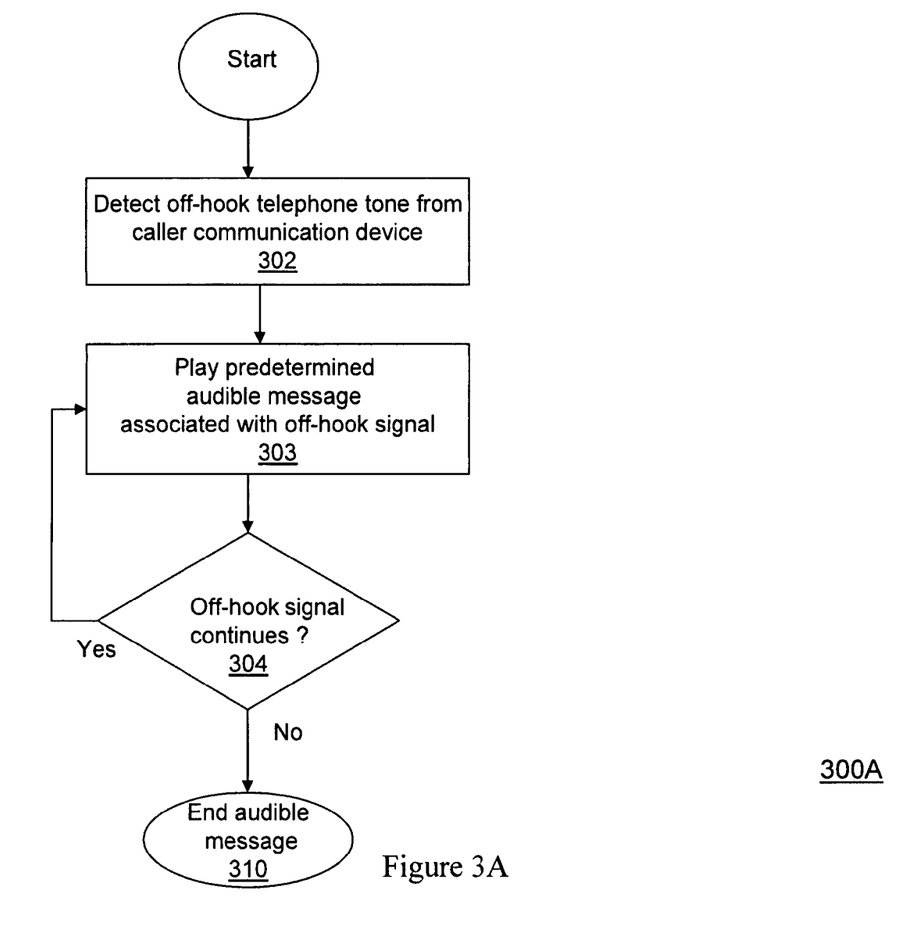
FIG. 3A is a flow chart illustrating the operation of generating audible messages in replacement of tones before dialing a call, in an off-hook state.

Referring to FIG. 3A, a flow chart illustrating the general operation of the tone provider module 107, while in the off-hook state but before dialing the recipient telephone number, is represented by the numeral 300A. In step 302, the tone detector interface 106 detects a request for communication via an off-hook telephone tone from communication device 102. At step 303, the tone replacement module 108 retrieves and provides one or more corresponding audible messages to the communication device 102 for subsequent audible output thereon.

As illustrated in FIG. 3A, step 302 may be repeated as necessary. For example, at step 304, the tone detector interface 106 may be configured to determine at specific time intervals whether the off-hook telephone tone continues to be detected. Accordingly, a different audible message may be retrieved if the user remains off-hook for a long time. Or at step 310, the same audible message may be continually played until the tone detector interface 106 no longer detects the off-hook tone.

In one alternative embodiment, once the off-hook tone is detected at step 302, the audible message may be outputted on the communication device 102 for the entire duration, including from the time the user starts dialing the desired telephone number up to and until the call is completed.

Figure 3B:
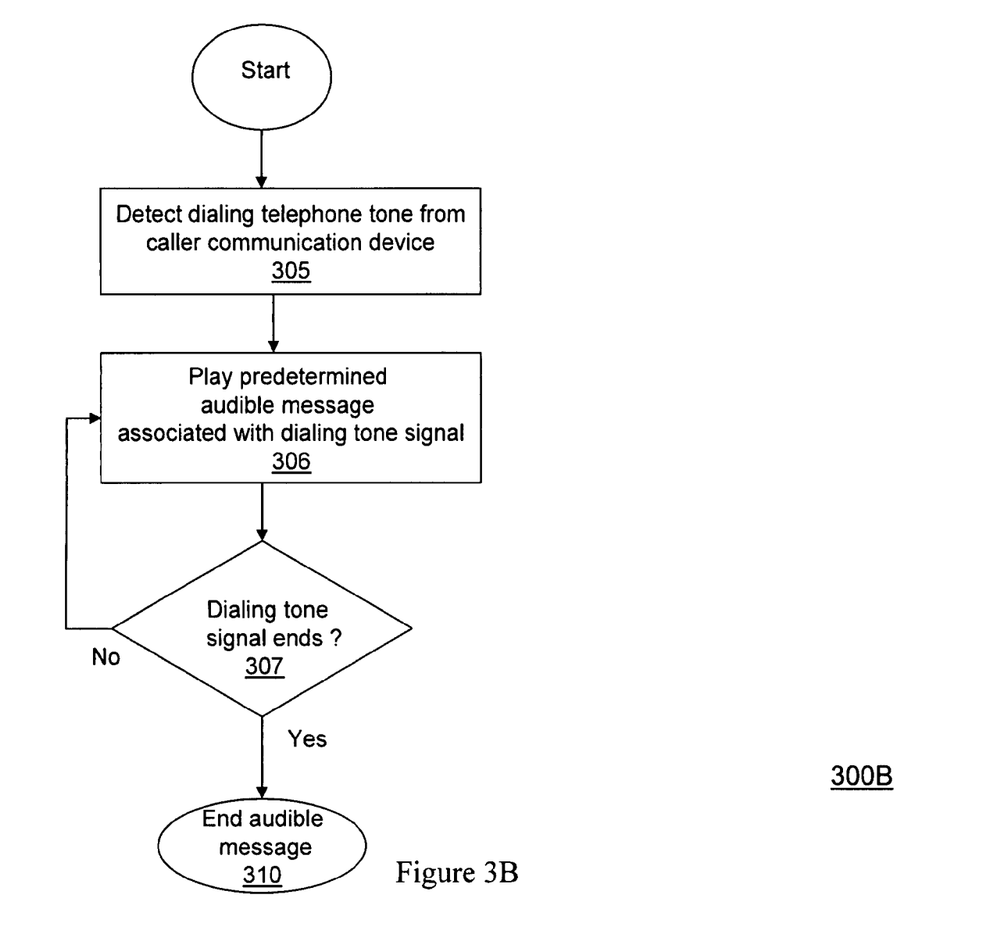
FIG. 3B is a flow chart illustrating the operation of generating audible messages in replacement of tones during dialing a call.

Referring to the flowchart FIG. 3B represented by 300B, if the telephone signal is not an off-hook signal, but instead dialing the recipient telephone number is initiated, at step 305, the tone detector interface 106 determines that a dialing tone is detected. As described herein, the dialing tone may refer to a tone (including DTMF tones) provided from the communication device 102 indicating that dialing the recipient telephone number has been initiated, regardless of which method (of the various exemplary methods discussed earlier) is used to initiate the call. At step 306, the tone replacement module 108 retrieves and plays one or more pre-determined audible messages associated with the dialing tone. In one embodiment, step 306 may be repeated while it is determined, at predetermined programmed intervals, whether a dialing tone is still present. At step 310, once the dialing tone or dialing attempt ends, such as by the user terminating the attempted call, or by successful completion of the attempted call, the audible message may be terminated.

In one embodiment, when dialing the digits of the recipient phone number manually tone provider module 107 may instruct the processor of the communication device 102 to silence the DTMF tones such that one or more audible messages are played instead for each key pressed on the keypad of the phone.

Figure 4:
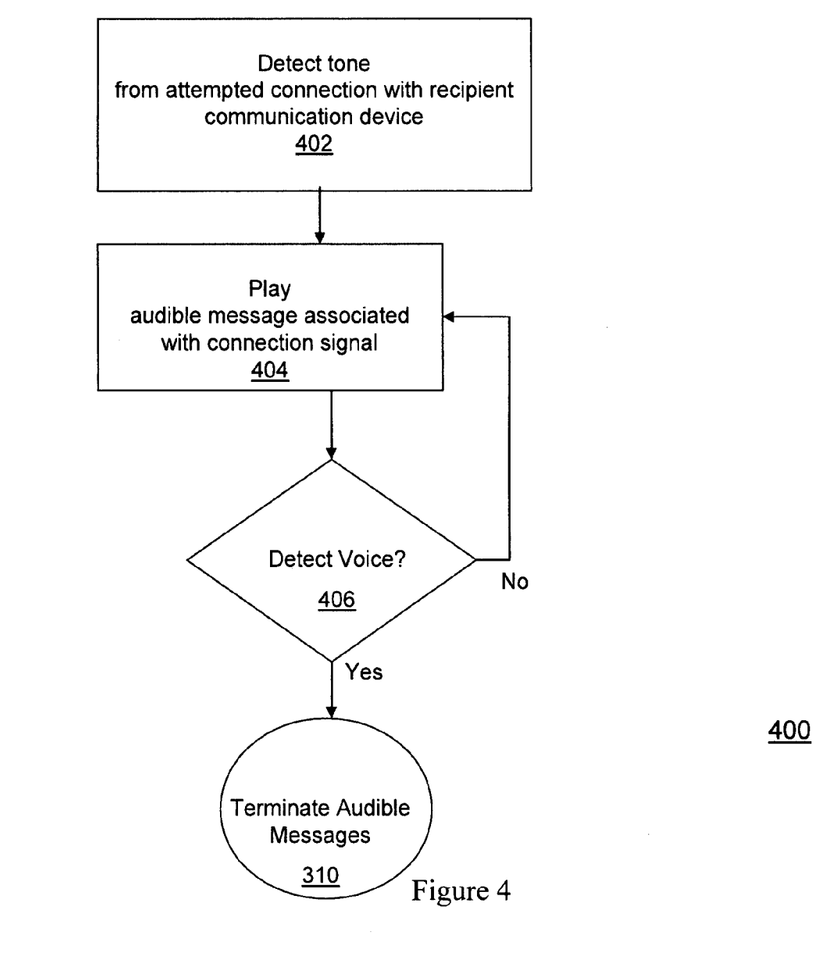
FIG. 4 is a flow chart illustrating the operation of generating audible messages in replacement of connection tones after dialing of a call, and a call connection is attempted.

Referring to FIG. 4, a flow chart illustrating the general operation of the tone provider module 107 after dialing, and once a call connection is made, may be represented by numeral 400. At step 402, the tone detector interface 106 detects a connection tone from a recipient communication device. As described earlier, the connection tone may be indicative of a ring-back tone, a call-busy or line-busy tone, a network busy tone or the like. Accordingly in step 404, the tone replacement module 108 retrieves and provides one or more pre-determined audible messages associated with the respective connection tone. At step 406, the tone provider module 107 continually monitors the status of the call and determines whether the call is picked up at the recipient communication device (i.e. voice detected). Accordingly, in this embodiment, the tone provider module 107 may comprise a voice detector (not shown) for detecting voice from a recipient communication device following the detection of the connection signal. Once a voice is detected, at step 406, the tone replacement module may be configured to terminate providing audible messages for audible output on the communication device 102.

In the case of a recipient communication device 102, once a call connection is made, the ring tone usually generated there may be similarly replaced with one or more audible messages. A user may customize the number of rings that may accompany an incoming call on a recipient communication device 102, and accordingly, the message may be played for a duration equivalent to the customized number of rings. In this situation, a user might be motivated to customize the communication device to allow a reduced number of rings before answering, possibly for battery power depletion considerations. In such a case, each ring may be replaced by a separate audible message, for example in the form of a commercial "jingle", outputted at recipient communication device 102. A "jingle" might be set to music associated with a particular source of a product or service, or may be a non-musical voice message associated therewith. With each "jingle" possibly representing different commercial promotions, and each "jingle" potentially being a complete and separate commercial message in itself, for instance, it becomes possible to have multiple distinct and complete messages, even though only a reduced number of rings may be allowed by a user, for battery power depletion considerations.

Referring to FIGS. 3A, 3B and FIG. 4, it may be envisaged that in one scenario, one or more audible messages are output on the communication device 102 from the time that the communication device 102 is picked up (i.e. considered off-hook) until voice is detected at the recipient communication device. Alternately, audible messages may be outputted prior to call completion (i.e. instead of the dial-tone and DTMF tones) until the connection signal is detected, at which time, the connection tones may be played instead. Further alternately, the audible messages may only be played while the user is placing the call (i.e. in replacement of the DTMF tones). Other variations of outputting one or more audible messages during at least one detected telephone signal may be envisaged.

Although certain embodiments have been described herein, it will be understood by those skilled in the art that variations may be made thereto without departing from the scope of the appended claims.

What is claimed is:

1. A computer implemented system for providing a plurality of audible messages at a call-initiating communication device, the system comprising:
   a tone detector interface for detecting a ring tone provided at the communication device;
   an audible messages database accessible to the tone detector interface and the communication device, the audible messages database storing the plurality of audible messages;

a tone replacement module in communication with the tone detector interface, the tone replacement module providing the plurality of audible messages in replacement of a customized plurality of rings generated at a call-recipient communication device, each one of the plurality of audible messages being provided in replacement of a respective one of the customized plurality of rings; and a voice detector for detecting a voice generated at a called recipient phone number, wherein, in response to detecting the voice generated, the tone replacement module is configured to terminate providing the audible messages.

2. A call-initiating communication device comprising:

a tone detector interface for detecting a pre-determined telephone tone provided at the communication device;

a tone replacement module in communication with the tone detector interface, the tone replacement module providing a plurality of audible messages in replacement of a customized plurality of rings generated at a call-recipient communication device, each one of the plurality of audible messages being provided in replacement of a respective one of the customized plurality of rings, wherein the plurality of audible messages is stored within an audible messages database accessible to the communication device; and a voice detector for detecting a voice generated at a called recipient number, wherein, in response to detecting the voice generated, the tone replacement module is configured to terminate providing the plurality of audible messages.

3. A computer implemented method for providing a plurality of audible messages at a call-initiating communication device, the method comprising:

detecting, at a tone detector interface, a ring tone provided at the communication device;

replacing, at a tone replacement module, a customized plurality of ring tones generated at a call-recipient communication device with the plurality of audible messages, each one of the plurality of audible messages being provided in replacement of a respective one of the customized plurality of ring tones;

detecting a voice generated at a called recipient phone number; and terminating, in response to detecting the voice generated at the called recipient number, the providing of the plurality of audible messages.

4. A computer implemented method for providing a plurality of audible messages at a call-initiating communication device, the method comprising:

detecting, at a tone detector interface, a ring tone provided at the communication device;

replacing, at a tone replacement module, a customized plurality of ring tones generated at a call-recipient communication device with the plurality of audible messages, each one of the plurality of audible messages being provided in replacement of a respective one of the customized plurality of ring tones; and generating and playing at least one audible message until the tone detector interface detects a call recipient voice.

* * * * *